(12) United States Patent
Sell et al.

(10) Patent No.: US 11,841,518 B2
(45) Date of Patent: Dec. 12, 2023

(54) HIGH-EFFICIENCY, LARGE-AREA, TOPOLOGY-OPTIMIZED METASURFACES

(71) Applicant: The Board of Trustees of the Leland Stanford Junior University, Stanford, CA (US)

(72) Inventors: David Sell, Palo Alto, CA (US); Jonathan A. Fan, Los Altos, CA (US); Thaibao Phan, Redwood City, CA (US); Jianji Yang, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/606,729

(22) PCT Filed: Apr. 29, 2020

(86) PCT No.: PCT/US2020/030542
§ 371 (c)(1),
(2) Date: Oct. 26, 2021

(87) PCT Pub. No.: WO2020/223399
PCT Pub. Date: Nov. 5, 2020

(65) Prior Publication Data
US 2022/0214479 A1   Jul. 7, 2022

Related U.S. Application Data

(60) Provisional application No. 62/840,169, filed on Apr. 29, 2019.

(51) Int. Cl.
*G02B 5/18* (2006.01)
*G02B 1/00* (2006.01)

(52) U.S. Cl.
CPC .............. *G02B 5/188* (2013.01); *G02B 1/002* (2013.01); *G02B 2207/101* (2013.01)

(58) Field of Classification Search
CPC .. G02B 5/188; G02B 1/002; G02B 2207/101; G02B 1/00; G02B 1/005; G02B 1/007; G02B 5/00; G02B 5/18; G02B 2005/1804; G02B 5/1809; G02B 5/1814; G02B 5/1819; G02B 5/1828; G02B 5/1847; G02B 5/1861; G02B 5/1866; G02B 5/1871
USPC ....... 359/565, 558, 566, 569, 573, 574, 575, 359/576
See application file for complete search history.

(56) References Cited

U.S. PATENT DOCUMENTS 10,883,799 B1\* 1/2021 Ni .............................. F41H 3/02
2019/0044003 A1\* 2/2019 Heck ...................... G02B 1/002
(Continued)

*Primary Examiner* — Arnel C Lavarias
(74) *Attorney, Agent, or Firm* — Crawford Maunu PLLC

(57) ABSTRACT

Certain examples are directed to optical elements or devices that pass or process the light based on a set of connectable metasurface elements having been topology optimized. The connectable metasurface elements are independently optimized or designed to have each section having its own metasurface phase profile corresponding to a desired phase profile. In this way, such devices need not be designed or manufactured by importing a large number of results into simulation efforts, thereby realizing significant saving in terms of optimization time and computational power.

23 Claims, 8 Drawing Sheets

(56) References Cited

U.S. PATENT DOCUMENTS

2019/0113775 A1\* 4/2019 Jang ..................... G02B 5/0236
2019/0154877 A1\* 5/2019 Capasso ................. G02B 1/002

\* cited by examiner

HIGH-EFFICIENCY, LARGE-AREA, TOPOLOGY-OPTIMIZED METASURFACES

FEDERALLY-SPONSORED RESEARCH AND DEVELOPMENT

This invention was made with Government support under contract FA9550-18-1-0070 awarded by the Air Force Office of Scientific Research and under contract N00014-16-1-2630 awarded by the Office of Naval Research. The Government has certain rights in the invention.

BACKGROUND

Metasurfaces are optical devices that utilize subwavelength-scale structuring to shape and manipulate electromagnetic waves. They are powerful complements to bulk refractive and scalar diffractive optics and have a wide range of potential uses and applications involving imaging, lithography, sensing, and/or computing platforms. To date, a broad range of metasurface design concepts have emerged. The most widely used methods may sample the desired phase profile at discrete points, and specify phase shifting elements, in order to form a nanoscale phased array, as illustrated in FIG. 1A. These methods utilize a library of simple, physically-intuitive building blocks including anisotropic waveguides, Mie resonators, plasmonic resonators, and dielectric transmit arrays and can quickly produce macroscale device designs. However, these approaches lack the necessary degrees of freedom to achieve high efficiency in devices designed for large angle deflections, multiple functions, and broadband responses, preventing metasurfaces from being practically applied in many contexts.

Topology optimization, including mathematical methodology that optimizes material layout for or within a given design space and for a given set of constraints with the goal of practicably maximizing the performance of the system relative to a desired reference. Certain optimization approaches, including objective-first and adjoint-based topology optimization, have produced photonic crystals, optical demultiplexers, and spectral splitters with effective performance resulting from the devices' unusual geometries and non-intuitive optical dynamics. More recently, topology optimization has led to high-performance metasurfaces with a broad range of capabilities, such as high-efficiency light deflection with nearly arbitrary input and output angles, spectral sorting of plane waves to distinct diffraction orders, and light focusing with field-curvature correction. While devices designed using topology optimization support enhanced efficiencies, they involve extensive computational resources that dramatically increase with the size of the device. As such, current topology-optimized devices are either microscale in dimension or limited to periodic structures with microscale unit cells.

SUMMARY

Various example and aspects of the present disclosure are directed to issues such as those addressed above and/or others which may become apparent from the following disclosure and concerning the design, manufacture, and/or uses of optical elements (or lens-type devices) and in which such a device or apparatus to pass or process the light benefits from a set of connectable metasurface elements being or having been topology optimized.

In more specific aspects, such connectable metasurface elements are independently optimized or designed to have each section having its own metasurface phase profile corresponding to a desired phase profile. In this way, such devices need not be designed or manufactured by importing a large number of results into simulation efforts, thereby realizing significant saving in terms of optimization time and computational power.

In a specific methodology example, a method according to the present disclosure is based on use or provision of each of a plurality of series-connectable, or discretized, wavelength-scale sections having phase shifting characteristics associated with a desired phase profile. The method includes providing a plurality of connectable metasurface elements that optimally scatter light as involved for each section of the desired phase profile, with the metasurface elements configured to form a multi-section metasurface having a metasurface phase profile corresponding to the desired phase profile.

Certain other examples and aspects of the present disclosure are directed to metasurface designs that may be used to extend the high performance of topology-optimized devices to macroscopic areas in a computationally efficient manner. In a more particular example, first a desired phase profile is discretized into a series of wavelength-scale, linear sections. Then, topology optimization is used to design metasurface elements that optimally scatter light as involved for each section of the phase profile. Next, the elements are stitched together to form a full metasurface. This approach may produce devices that operate more efficiently than conventional designs by accounting for and optimizing near-field optical coupling between neighboring nanostructures.

In yet further examples relating to and useful together with the above aspects, the multi-section metasurface is provided with neighboring or adjacent ones of the metasurface elements manifesting a common design using topology optimization that mitigates near-field optical coupling between sections, and a series of wavelength-scale linear sections may include computing or discretizing the sections as linear sections using adjoint-based topology optimization.

In a more specific example embodiment, the metasurface elements are geometrically optimized nanostructures having optical properties to provide a particular or unique optical response when adjoined together so that the nanostructures include at least one layer of silicon geometric structure.

In another specific example embodiments, aspects of the above-characterized aspects and optical elements/devices involve geometric optimization of an aperiodic device comprising at least one layer of geometric structures, where the layer includes the multi-section metasurface(s). Optimization topology is used associated with the desired phase profile to provide a particular optical response and including: selecting a starting point for a continuous profile to have particular optical properties for the particular optical response; and iteratively converging the continuous profile to a discrete profile during each of the iterations improving a Figure of Merit (FoM) by changing a dielectric constant at one or more locations associated with the at least one layer of geometric structures of the device and, over a plurality of the iterations, to cause a dielectric continuum of the device component at locations to converge to the dielectric constant of materials forming the geometric structures.

In yet further aspects, one or more of the above metasurface-based approaches are used to extend high performance attributes of topology-optimized devices such as to both macroscopic areas and microscopic areas. Consider, for example, the above approaches involving each of a plurality of series-connectable wavelength-scale sections having phase shifting characteristics associated with a desired phase profile, where f is the focal length and is the wavelength of the normally-incident light: wherein at least one of the wavelength-scale sections may be characterized by a section length (or tile length in the case of a planar tile) and RMS wavefront error (for indicating an aberration level) which may be set as functions and may vary for a given goal and/or set of conditions (e.g., controlling/setting such lengths and/or the RMS wavefront error) with such error ranging from $\lambda/50$ to $\lambda/10$ respectively for lengths ranging from $0.73 \sqrt{f\lambda}$, to $1.63 \sqrt{f\lambda}$).

The above discussion/summary is intended only to exemplify aspects of the present disclosure and is not intended to describe each embodiment or every implementation of the present disclosure.

BRIEF DESCRIPTION OF THE FIGURES

Various examples may be more completely understood in consideration of the following detailed description, and in the following drawings in which.

Figure 1A:
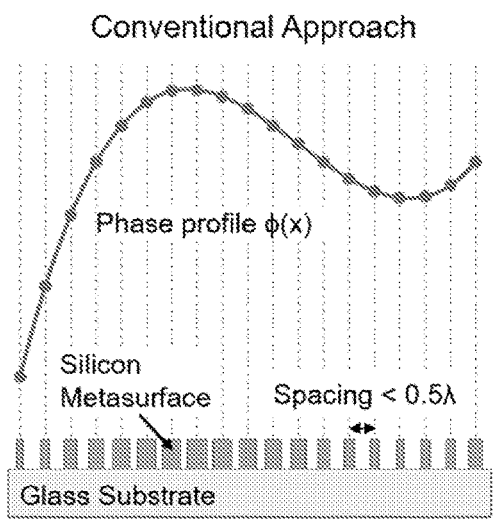
FIG. 1A shows a graph illustrating a conventional approach to metasurface design.

While various embodiments discussed herein are amenable to modifications and alternative forms, aspects thereof have been shown by way of example in the drawings and will be described in detail. It should be understood, however, that the intention is not to limit the disclosure to the particular embodiments described. In addition, the term "example" as used throughout this application is only by way of illustration, and not limitation.

DETAILED DESCRIPTION

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Exemplary aspects of the present disclosure are directed to a variety of different types of apparatuses (e.g., systems, devices and the like) and methods of use and manufacture involving geometrically optimized device components having optical properties for a particular optical response. Certain implementations are used in the context of device components formed of at least one layer of silicon geometric structures and wherein portions of the device components are combined together to form an aperiodic device and/or apparatus. As examples of various specific aspects, such an apparatus or method involves use or manufacture of thin-film solar cells, a hyper-spectral imaging system, various types of lenses (e.g., a dielectric flat lens or a polarization sensitive lens), a thermal management metasurface, a light emitting device, a fluorescence imaging system, a wearable flexible device, and/or a micro-electro-mechanical system (MEM), among other devices and/or systems. The device components may be formed of a plurality of layers of geometric structures. While not necessarily so limited, various aspects may be appreciated through a discussion of examples using such exemplary contexts.

In certain more specific examples/embodiments, aspects are directed to a device (and/or its manufacture) that can focus light, as further exemplified by device having one or more lenses that are flat optical elements. Consistent with the above aspects, such a device or manufacture may involve optimization of a selected number of sections of a substrate (i.e., material) before stitching the optimized sections together.

Yet other exemplary aspects are directed to devices (and their manufacture) that involve optimization of a selected number of sections of a substrate (i.e., material). These aspects may involve lenses constructed with linear sections (e.g., for which the Strehl ratio may be used as a metric that compares the diffraction efficiency of the lenses described herein to that of an ideal lens). To minimize phase error a lens that focuses normally-incident light, for example, a phase profile may be characterized using a Strehl ratio (e.g., about 0.98 (±20%)) and as a function of (or based on parameters associated) with focal length and wavelength, so as to minimize the phase error (e.g., realizing an RMS wavefront error of about λ/50 (±20%)). This may be particularly advantageous for embodiments in which the linear sections are sufficiently small as apparent from the effect of linearization for a general curvilinear phase profile and/or as may be deduced from experimenting in line with the present disclosure for approximating a curvilinear phase profile with a series of linear sections.

Other more-specific optimization-related aspects are characterized using equations (3) and (4), as disclosed below, before stitching the optimized sections together.

Other specific examples may be appreciated in connection with the dependent relationship between section lengths and associated aberration level for a given multi-section metasurface having a metasurface phase profile corresponding to a desired phase profile. In such examples, where the metasurface phase profile has an aberration level that may be indicated by RMS wavefront error and has at least one of the sections with a length that depends on the aberration level, the aberration level and corresponding length are within a range having one boundary at λ/50 for RMS wavefront error for a length at 0.73 √fλ and having another boundary at λ/10 for RMS wavefront error for a length at 1.63 √fλ, wherein with f corresponding to focal length and λ corresponding to wavelength of normally-incident light on the multi-section metasurface. In more specific embodiments and as may be reflected mathematically, such dependent relationships for different example aberration levels may be appreciated by way of the following table:

$$\epsilon_{RMS} = \frac{\lambda}{50} \rightarrow d = 0.73\sqrt{f\lambda}$$

$$\epsilon_{RMS} = \frac{\lambda}{40} \rightarrow d = 0.82\sqrt{f\lambda}$$

$$\epsilon_{RMS} = \frac{\lambda}{28} \rightarrow d = 0.98\sqrt{f\lambda}$$

$$\epsilon_{RMS} = \frac{\lambda}{20} \rightarrow d = 1.15\sqrt{f\lambda}$$

$$\epsilon_{RMS} = \frac{\lambda}{14} \rightarrow d = 1.38\sqrt{f\lambda}$$

$$\epsilon_{RMS} = \frac{\lambda}{10} \rightarrow d = 1.63\sqrt{f\lambda}.$$

Figure 1B:
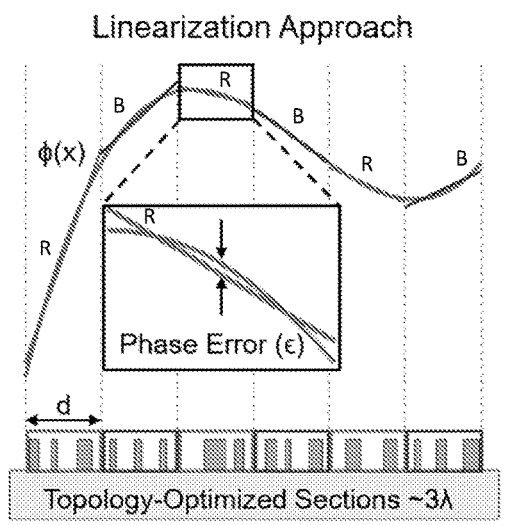
FIG. 1B shows a graph illustrating an example approach to metasurface design, in accordance with various embodiments.

Certain aspects of the present disclosure are directed to metasurface designs that extend the high performance of topology-optimized devices to macroscopic areas in a computationally efficient manner. One example is schematically illustrated in FIG. 1B, by way of three parts. First, a desired phase profile is discretized into a series of wavelength-scale, linear sections. Next, topology optimization is used to design metasurface elements that optimally scatter light as involved for each section of the phase profile. Finally, all the elements are stitched together to form a full metasurface. This approach may produce devices that operate more efficiently than conventional designs by accounting for and optimizing near-field optical coupling between neighboring nanostructures. The method may also be significantly more computationally efficient than existing topology optimization methods.

In other more specific examples, aspects of the present disclosure are directed to a computationally-efficient method for designing large-area, topology-optimized metasurfaces is disclosed. An approach of approximating a desired phase profile with a series of linear segments enables the design problem to be computationally tractable while minimally impacting the device performance. Wavelength-scale scattering elements designed using topology optimization can strongly scatter light to a desired angle and phase, serving as high-performance building blocks for larger metasurfaces.

In other examples, aspects of the present disclosure are directed to high efficiency metalenses that are designed using topology optimization algorithms. These metalenses can be designed to operate at varying visible and infrared wavelengths, and include a number of features, such as: 1) they can focus light to a broad range of numerical apertures, including large (0.8+) numerical apertures, with high efficiencies; 2) they can incorporate multiple layers of nanostructures to achieve exceptional (95%+) light focusing efficiencies; 3) they can incorporate multiple layers of nanostructures to achieve multifunctional operation, such as coma and field-flatness correction; 4) the algorithms can readily generalize to produce metalenses with broadband response.

According to the present disclosure, certain uses (and in some instances application-specific embodiments) of metalenses have applications in technologies that has the focusing or collimation of light. At infrared and visible wavelengths, these include imaging systems for miniaturized consumer cameras and computer vision systems, optics for compact microscopes, wavelength sorters for hyperspectral imaging, and collimation optics for optoelectronic sources (ranging from lasers and LEDs to fibers and single photon sources). These technologies can be polarization-sensitive, can have a different responses as a function of polarization/wavelength, and can exhibit customizable wavefront response (parabolic, Bessel-type, etc.).

Somewhat unlike conventional refractive lenses, metalenses are flat and can be patterned in thin layers of dielectric materials, making them ideal for manufacturing and integration with optoelectronic devices. In this context, certain example metalenses as described herein are based on topology optimization (and potentially multiple layers) and have the potential for significantly higher efficiencies and high performance multifunctional response (i.e., coma correction, different functions for different wavelengths, etc.). Depending on the applications and implementations involved, such exemplary metalenses as described herein are advantageous (e.g., relative to conventionally-designed scalar diffractive optical elements and metalenses).

In other examples, and turning to FIG. 1B, a linearization approach is shown for topology-optimized sections of an example metalens. As denoted in FIG. 1B, the sections are shown in alternating colors, which are red and blue, and are additionally labelled with "R" and "B." The process of approximating a curvilinear phase profile with a series of linear sections, such as in FIG. 1B, introduces wavefront error, ε. The wavefront error for one red (or "R") section that is shown enlarged may be understood by comparing the linear section (R) to the curvilinear profile (in gray). This error has negligible impact on overall metasurface performance as long as the sections are sufficiently small. To analyze the effect of linearization for a general curvilinear phase profile φ(x), each section of φ(x) is locally described at location $x_\sigma$ using a 2nd-order Taylor series expansion:

$$\phi(x) \approx \phi(x_0) + \phi'(x_0)(x - x_0) + \frac{1}{2}\phi''(x_0)(x - x_0)^2 \quad (1)$$

Each section can be approximated as a line of slope φ'(x₀) with a phase offset φ(x₀)+Δφ, which incurs an error of $\epsilon(x)=\phi''(x_0)(x-x_0)^2/2-\Delta\phi$. Given a section of length d at position $x_0$, the RMS wavefront error is minimized when $\Delta\phi=\phi''(x_0)d^2/24$ and is:

$$\epsilon_{rms}(\Delta x) = \frac{1}{12\sqrt{5}}\phi''(x_0)d^2 \qquad (2)$$

The result can be used to analyze the impact of linearization on a focusing cylindrical lens, which allows a benchmark of device performance using well-established metrics in lens design. To quantify the performance of lenses constructed with linear sections, the Strehl ratio may be used, which is a metric that compares the diffraction efficiency of the lenses described herein to that of an ideal lens. For a lens that focuses normally-incident light, the ideal phase profile is $\phi(x)=(2\pi/\lambda)(f-\sqrt{f^2+x^2})$ where f is the focal length and $\lambda$ is the wavelength. A lens with a Strehl ratio of 0.98, corresponding to an RMS wavefront error of $\lambda/50$, can be achieved if linear sections are used that are no larger than:

$$d < 0.73\sqrt{f\lambda} \qquad (3)$$

Figure 2B:
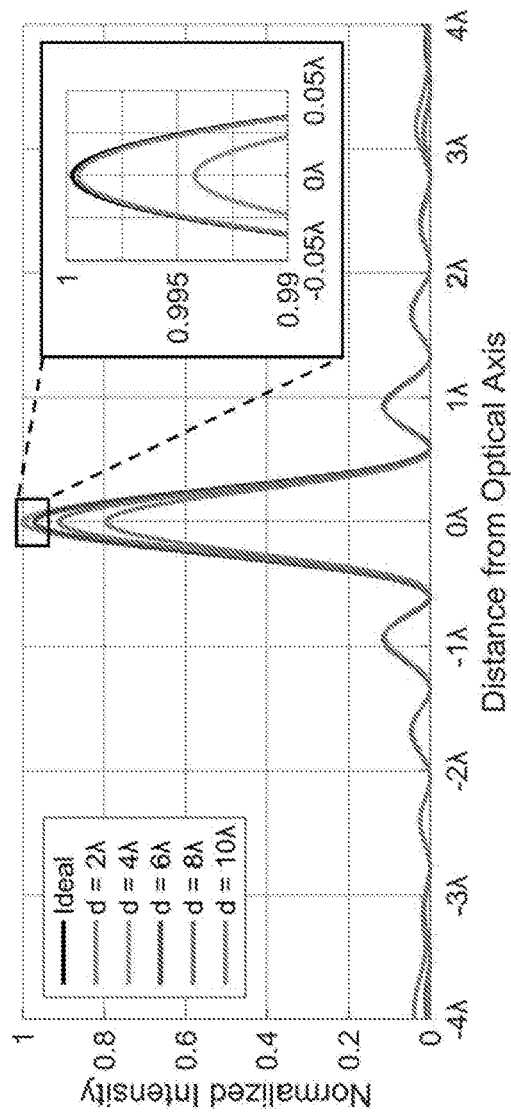
FIG. 2B shows a graph illustrating line scans of field intensity at focal planes of an example lens, in accordance with various embodiments.
Figure 2A:
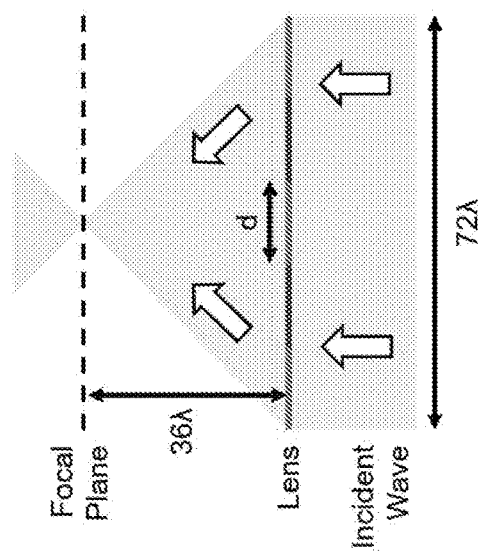
FIG. 2A shows an illustration of an example linear section of an example lens, in accordance with various embodiments.

This equation provides a practical and quantitative guide for linearizing phase profiles in a manner that minimizes phase error and it is appreciated that in less stringent applications, other section lengths are contemplated such as $0.85\times$ or $0.9\times\sqrt{f\lambda}$. As an example, consider a cylindrical lens with a focal length $f=36\lambda$ and a numerical aperture (NA) of 0.7, as in FIG. 2A. Using Eqn. 3, the expectation is that linearizing the phase profile with segments smaller than $4.4\lambda$ will have negligible impact on performance. To verify, lenses linearized with various segment lengths are simulated and the field intensities at the focal plane are calculated. These field intensity profiles are plotted in FIG. 2B and show that lenses linearized with section lengths of $2\lambda$ and $4\lambda$ are nearly indistinguishable (within 1%) from the ideal lens. In other examples, such field intensity profiles may be adequate to lesser degrees, say within 3% or 5% relative to one another.

In other examples, aspects of the disclosure relate to an approach to sectioning readily extends to three-dimensional phase profiles, which can be approximated as a series of planar tiles, as is known and discussed in connection with the underlying provisional document. For a hyperboloid discretized into tiles with dimensions d×d, an RMS wavefront error of $\lambda/50$ can be realized if:

$$d < 0.61\sqrt{f\lambda} \qquad (4)$$

To design metasurface elements having desired linear phase profiles, adjoint-based topology optimization is utilized. Adjoint-based optimization is an iterative algorithm that modifies the device's dielectric constant distribution $\epsilon(x)$ to maximize a figure of merit (FoM). The goal is to optimize a device that scatters normally-incident electromagnetic waves to a desired direction with electric field amplitude $E_{tgt}$ and phase $\phi_{tgt}$. To compute the FoM, a forward simulation may be run in which waves incident onto the metasurface element scatter to the desired direction with field amplitude $E_{fwd}$ and phase $\phi_{fwd}$. Near-to-far-field transformations from the forward simulations are used to evaluate $E_{fwd}$ and $\phi_{fwd}$. The FoM describes the difference between the current and desired responses and has the form:

$$FoM = -A_1\left[|E_{tgt}|^2 - |E_{fwd}|^2\right]^2 - A_2\left[\arg\left(e^{i(\phi_{tgt}-\phi_{fwd})}\right)\right]^2 \qquad (5)$$

The terms $A_1$ and $A_2$ are weights that balance how strongly the FoM is biased towards optimizing amplitude or phase, respectively. To determine how $\epsilon(x)$ should be modified to improve the FoM each iteration, a pair of forward and adjoint simulations are performed and the electric fields in the device are recorded for each excitation condition. These fields are used to calculate $\delta$FoM, which is the gradient of the FoM with respect to dielectric constant at each position x:

$$\delta FoM = 2A_1(|E_{tgt}|^2 - |E_{fwd}|^2)\mathcal{R}e\{E_{fwd}\cdot\delta E^*\} - 2A_2(\phi_{tgt}-\phi_{fwd})\frac{1}{|E_{fwd}|^2}\mathcal{I}m\{E_{fwd}\cdot\delta E^*\} \qquad (6)$$

where $\delta E$ is a function of the adjoint field and represents the variations of the field in the target direction in response to variations of refractive index within the device. As an example of a more detailed discussion of adjoint optimization, reference may be made to other documents such as discussed in connection with the underlying provisional document.

Figure 1C:
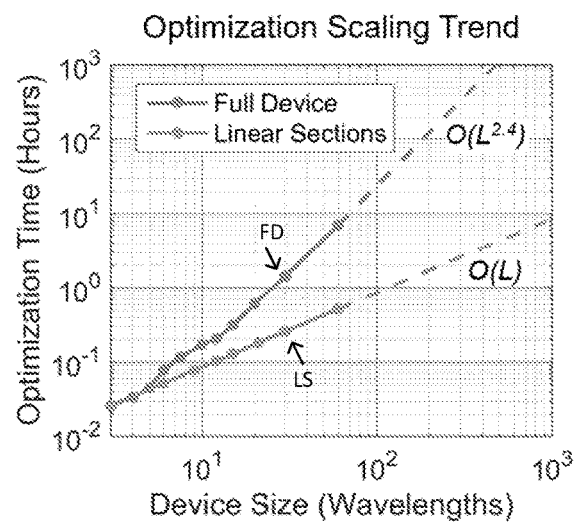
FIG. 1C shows a graph illustrating a comparison of computation time versus device size for topology-optimized metasurfaces designed using different approaches, in accordance with various embodiments.
Figure 1D:
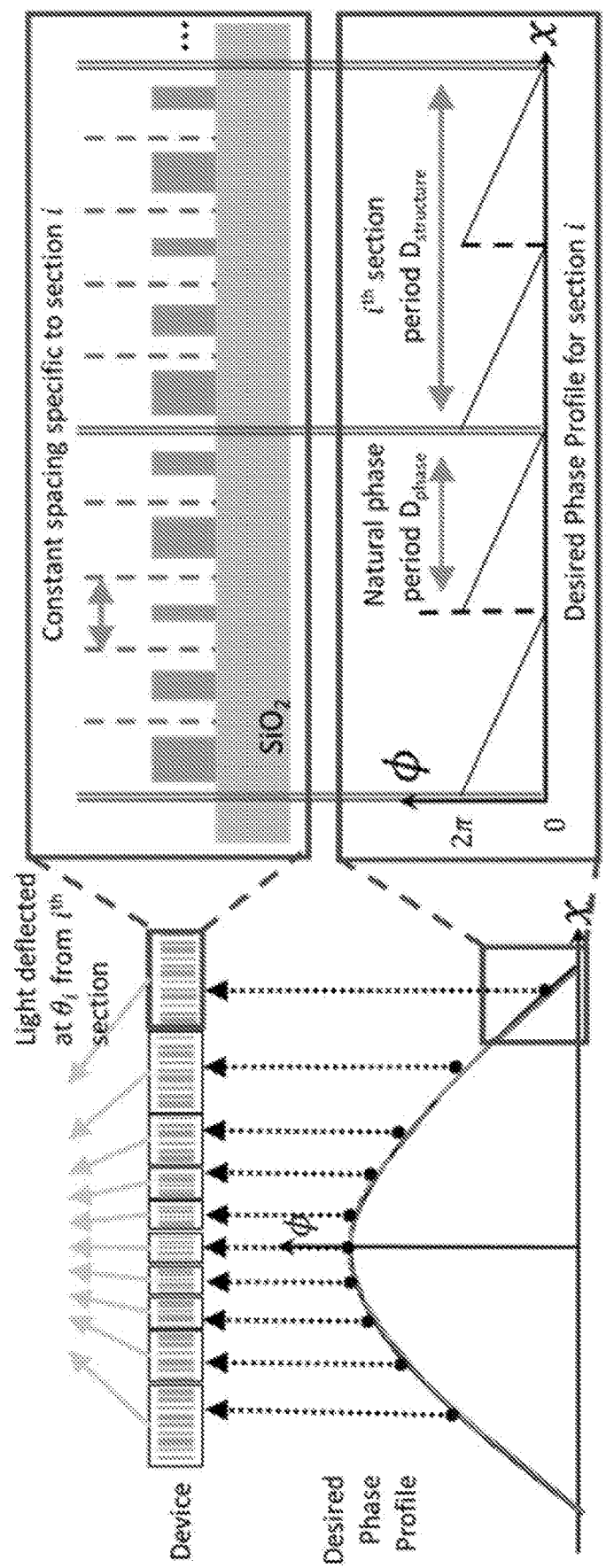
FIG. 1D illustrates a relationship between linear wavelength-scale sections and a larger structure that may related to a multi-section metasurface manifesting a desired phase profile which may be processed by discretizing and subdivision into a series of linear wavelength-scale sections to be subsequently stitched together, also in accordance with examples of the present disclosure.

In certain approaches leveraging from the above aspects, a desired phase profile may be set or provided for a multi-section metasurface including a plurality of series-connectable wavelength-scale sections. Each of the wavelength-scale sections has phase shifting characteristics associated with the desired phase profile, for providing the plurality of connectable metasurface elements that optimally scatter light as involved for each section of the desired phase profile. In connection with the above approach involving curvilinear sectionizing, the desired phase profile may correspond to the above-characterized curvilinear phase profile which is subdivided into a series of linear wavelength-scale sections, each serving as a deflector. For the $i^{th}$ section deflecting a normally-incident beam to angle $\theta_i$ (e.g., as illustrated in FIG. 1D), the phase profile is linear and periodic, with a phase period $D_{phase}=\lambda/\sin\theta_i$. The spacing between phase shifting elements is defined such that the array of elements in the section is periodic with a period $D_{structure}$. Furthermore, $D_{structure}$ may be specified to be an integer multiple of $D_{phase}$ (see top inset of FIG. 1D). By enforcing these local periodicity conditions, the periodic structures may scatter light into a relatively narrow number of diffraction channels, via constructive interference effects. Light scattering into the continuum of other angles, which is undesirable, may be suppressed. These interference effects become more pronounced as the size of the segment becomes larger. For lenses, the phase profile away from the optical axis can be well approximated by long, linear sections. In these device regions, each grating-like section can support strong diffractive beam steering effects. Such structures may also be stitched together with the larger structures being based on such methodology used to design certain smaller stitched-together structures, and which in turn are based on such methodology used to design even smaller stitched-together structures.

To apply these concepts to the design of isolated, finite-sized device elements, an aperiodic Fourier modal method (AFMM) has been developed, which is a hybrid method that combines a solver for periodic systems with perfectly-matched layers (PMLs). The key challenge of implementing PMLs involves describing both the periodic incident plane wave (i.e., the input field) and the aperiodic scattered field (i.e., the output field) of the isolated device within the same formalism. To address this challenge, a hybrid method is introduced that combines a Fourier basis, Maxwell's equations in complex coordinates, and the Stratton-Chu integral formalism.

In other specific examples, a metasurface is typically composed of a single layer of patterned material. The patterned material can be expressed as a distribution of the relative permeability, namely, $\varepsilon(x,y)$, and permeability, $\mu(x,y)$ on the xy plane. Along the thickness of the device in the z-direction, the device cross-section is constant. In this case, it can be shown from Maxwell's equations that the transverse electric fields satisfy the following eigenvalue equation:

$$-\gamma^2 \begin{bmatrix} E_x \\ E_y \end{bmatrix} = \mathcal{L}_{EH} \mathcal{L}_{HE} \begin{bmatrix} E_x \\ E_y \end{bmatrix} \tag{7}$$

where $\mathcal{L}_{EH}$ and $\mathcal{L}H_E$ are differential operators based on $\varepsilon$ and $\mu$, and the electric field solution can be expressed as $\Phi(x,y)e^{-ik\gamma z}$. The Fourier modal method can easily be used to expand the input fields, assumed to be periodic, into a Fourier basis:

$$\Phi_{in}(x, y, z) = \sum_p A_p e^{-ik\gamma_p z} \sum_{nm} \delta_{nm,p} e^{-ik\alpha_n x} e^{-ik\beta_m y} \tag{8}$$

Next, the PML boundary conditions are described in a similar fashion. The PMLs can be introduced by a change of coordinates $(x,y,z) \rightarrow (\tilde{x},\tilde{y},\tilde{z})$:

$$\begin{cases} \tilde{x}(x) = (\chi_x - i\eta_x)(x - x_0) + x_0 \\ \tilde{y}(y) = (\chi_y - i\eta_y)(y - y_0) + y_0 \end{cases} \tag{9}$$

The parameter $\chi$ controls the scaling of the PML layers, while the parameter $\eta$ controls the PML attenuation. This transformation is also useful for expressing the output scattered fields, which are computed as eigenfunctions of Maxwell's equations written in complex coordinates:

$$\Phi_s(x, y, z) = \sum_p B_p e^{-ik\gamma_p z} \sum_{nm} \Phi_{nm,p} e^{-ik\alpha_n x} e^{-ik\beta_m y} \tag{10}$$

Finally, the Stratton-Chu integral equation computes the radiated field in all of space. In describing example embodiments, devices comprised of nanoridges may be described by a one-dimensional Fourier basis.

Figures 3A, 3B:
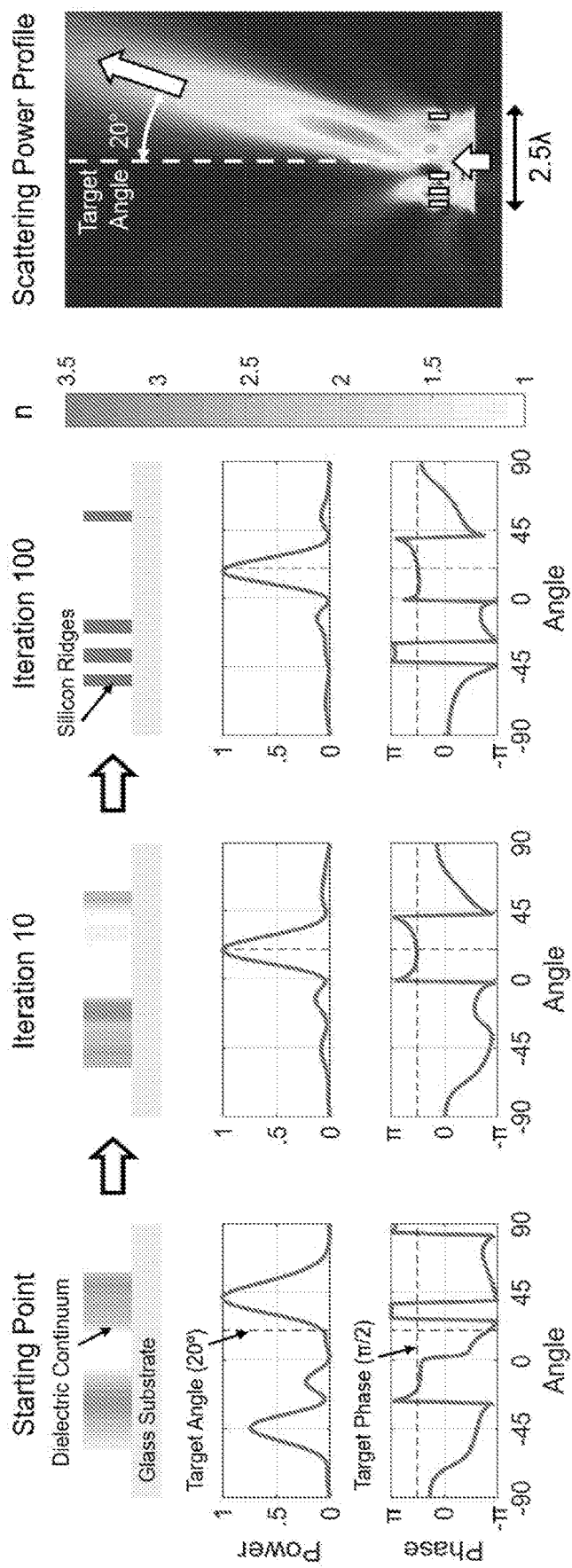
FIG. 3A shows dielectric distribution results at a starting point, after 10 iterations, and after 100 iterations, of an example optimization, in accordance with various embodiments.
FIG. 3B shows an intensity plot of a scattering power profile, in accordance with various embodiments.

To demonstrate the capability of adjoint-based optimization in the design of metasurface elements, a 2.5λ-wide element that scatters incident TM-polarized light to a 20° angle with a phase response of π/2 is designed. The dielectric distribution along with the amplitude and phase scattering profiles of the element at successive iterations in the optimization process are shown in FIG. 3A. FIG. 3A shows dielectric distribution results at a starting point, after 10 iterations, and after 100 iterations of an example optimization, in accordance with various embodiments. The optimization starts with a random dielectric continuum with values between air and silicon. After a few iterations, the continuum begins to strongly scatter light to the desired angle. The final metasurface section is a binary structure of silicon in air that possesses a peak scattering amplitude and phase response matching the targeted values. The full-width half-maximum of the scattering peak is consistent with that expected from light diffracting from a 2.5λ-wide aperture, indicating that the element is performing directional scattering near its physical limits.

An intensity plot of the scattered fields from the fully optimized section, as in FIG. 3B, shows strong near-field coupling between neighboring nanostructures, indicating that optimal near-field coupling is responsible for mediating strong scattering into the desired direction. As a method of gradient descent, adjoint-based topology optimization is a local optimizer and is sensitive to the initial dielectric distribution. To obtain high performance elements for a desired scattering angle and phase target, ten optimizations are performed with different initial dielectric distributions and the best result is selected.

In another specific example, an example cylindrical metalens may be constructed by stitching together optimized metasurface elements. As an example, the metalenses may focus TM-polarized light at a wavelength of 640 nm. To enable device operation at visible wavelengths, 250 nm-thick crystalline silicon is used, which has relatively low absorption compared to polycrystalline and amorphous silicon, but has a higher index contrast than materials such as titanium dioxide.

In another example, 64 µm-wide metalenses are designed and simulated with NAs ranging from 0.2 to 0.9. The metalenses are divided into 2 µm-wide linear sections, which is below the phase error limit of Eqn. 3 and near the optimal size for efficient computation (see FIG. 1C). Further reductions in the section size may lead to degradation of device performance. A reason may be traced to design of each metasurface element, which is optimized in isolation with PMP boundary conditions. When the elements are stitched together to produce a device, the optical fields that are guided by a single element have evanescent tails and can couple to a neighboring element in a parasitic manner. Smaller sections have more elements to be stitched together to produce a desired metasurface, thereby resulting in more boundaries and more parasitic coupling. Below a section size of 2λ, the device performance may begin to degrade and below a section size of 1λ, aperiodic boundary conditions in the optimizer may no longer be valid.

In other examples, there are a few approaches for addressing the issue of stitching error. One is to keep the section size relatively large compared to the wavelength. Another is to perform boundary optimization on the stitched regions themselves, to attempt to eliminate stitching error. A third approach, which is used, is to separate silicon structures from different sections by a gap of at least 0.2λ, thereby reducing the near-field coupling between sections. To ensure a reduction of stitching error with such a scheme, stitched sections are simulated to check for spurious diffraction, and sections are redesigned in the event of excess error.

Figure 4A:
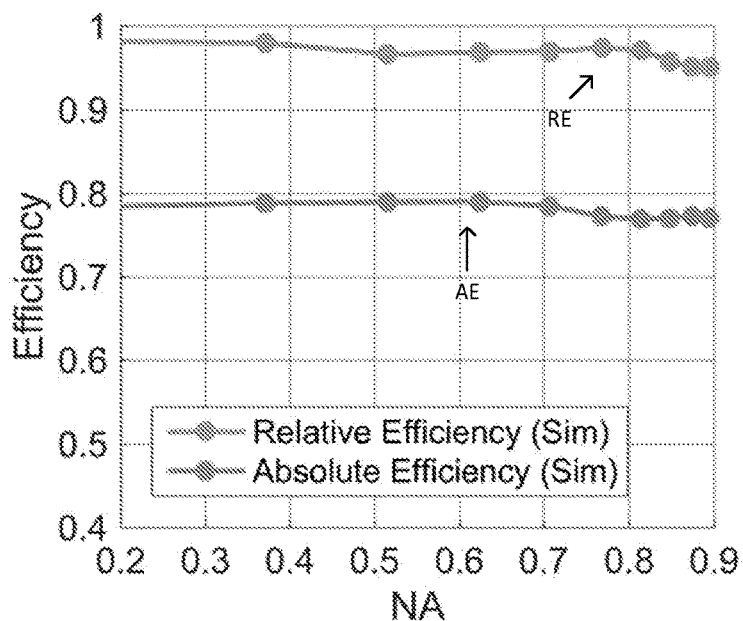
FIG. 4A shows a graph illustrating relative and absolute efficiencies for example metalenses designed with different numerical apertures, in accordance with various embodiments.

The efficiencies of the simulated metalenses are summarized in FIG. 4A. Absolute efficiency is defined as the amount of power contained in the principal lobe of the focus, compared to that of an ideal lens with 100% transmission. Relative efficiency, or focusing efficiency, compares the power in the principal lobe to that of an ideal lens that transmits the same amount of power as the device. This efficiency corresponds to the efficiency of the diffraction process, as it removes the effects of absorption from the material and reflection at the metalens interface.

Figure 4B:
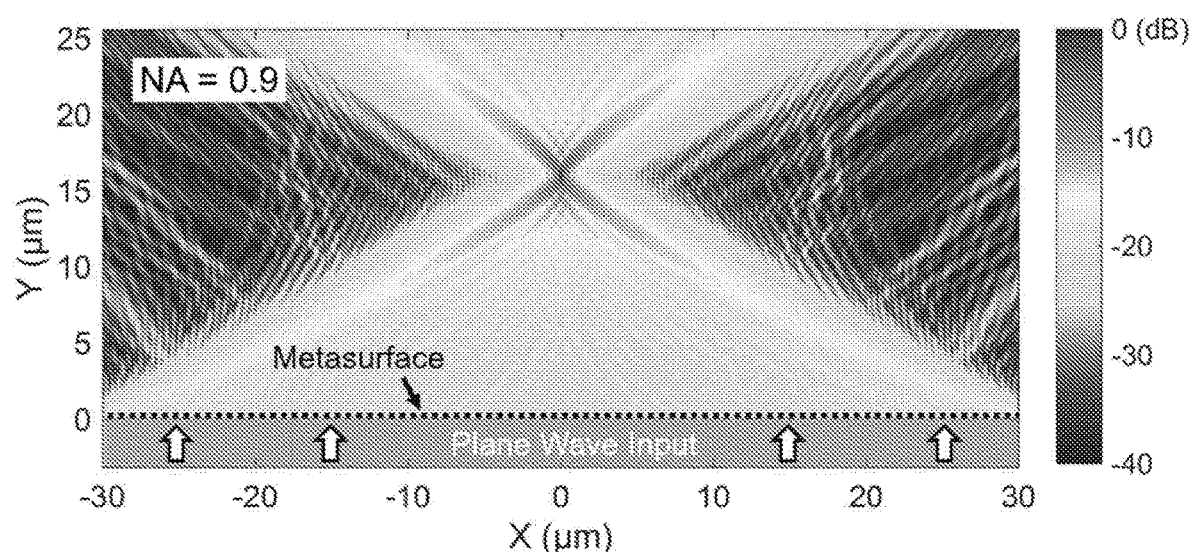
FIG. 4B shows a full-field simulation of an example metalens, in accordance with various embodiments.

The efficiency plots in FIG. 4A denote relative efficiency plots in green and with "RE," and absolute efficiency plots in red and with "AE." The plots show that the relative efficiencies are consistently high, above 93%, with minimal drop-off in performance as the NA increases. This trend is unlike that of conventional metalenses, where efficiency decreases for increasing NA because conventional designs cannot efficiently deflect light to large angles. The absolute efficiencies of the metalenses are all above 75%, with approximately 10% of the light reflected from the metalens and 10% absorbed by the silicon. Reflection losses can be reduced with the use of more intricate three-dimensional silicon nanostructures, while absorption losses can be minimized by designing silicon-based devices for longer wavelength operation. A simulated field profile of the metalens with an NA of 0.9 is shown in FIG. 4B, demonstrating that the lens focuses strongly with minimal spurious diffraction.

In another example embodiment, example 200 μm-wide metalenses with NAs of 0.2, 0.5, and 0.8 are designed, fabricated, and characterized. To prepare crystalline silicon thin films on glass, hydrogen silsesquioxane is used to bond silicon-on-insulator wafers onto Pyrex wafers under high temperature and pressure. After removing the silicon handle wafer and buried oxide layer, the devices are patterned and etched using standard electron beam lithography and dry etching techniques. The example metalenses are characterized by collimating polarized, monochromatic light from a tunable white light laser onto the devices and imaging the light at the focal plane with a 100× objective (NA=0.9) and a charge coupled device (CCD) sensor.

Figure 5A:
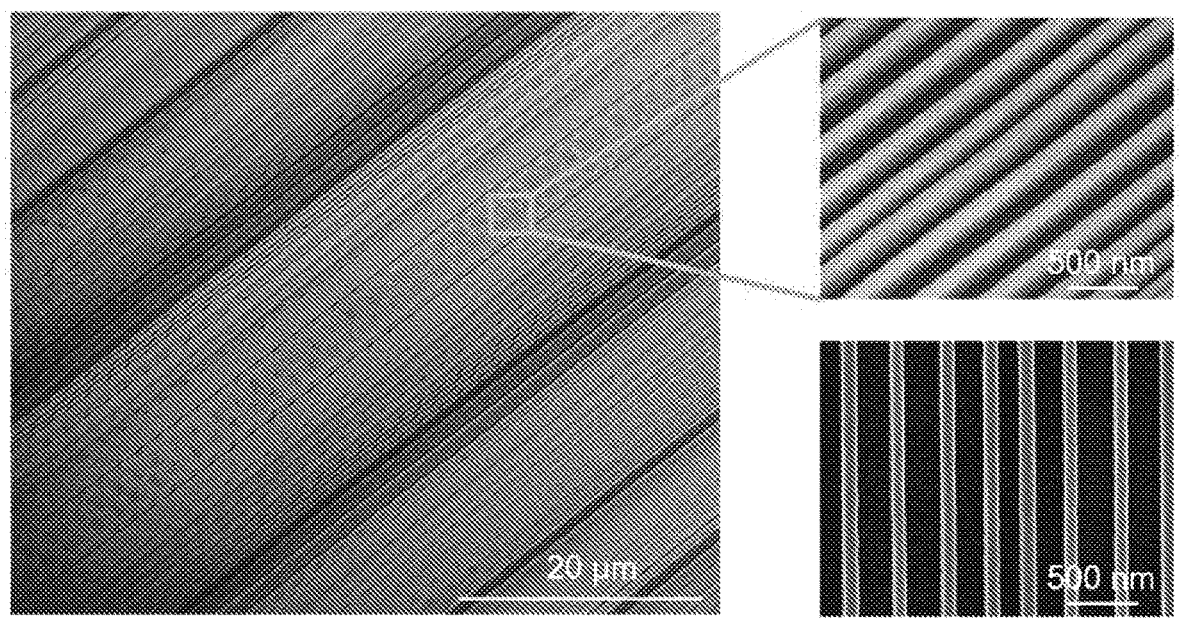
FIG. 5A shows scanning electron micrographs of an example metalens with tilted and top-down views, in accordance with various embodiments.
Figure 5B:
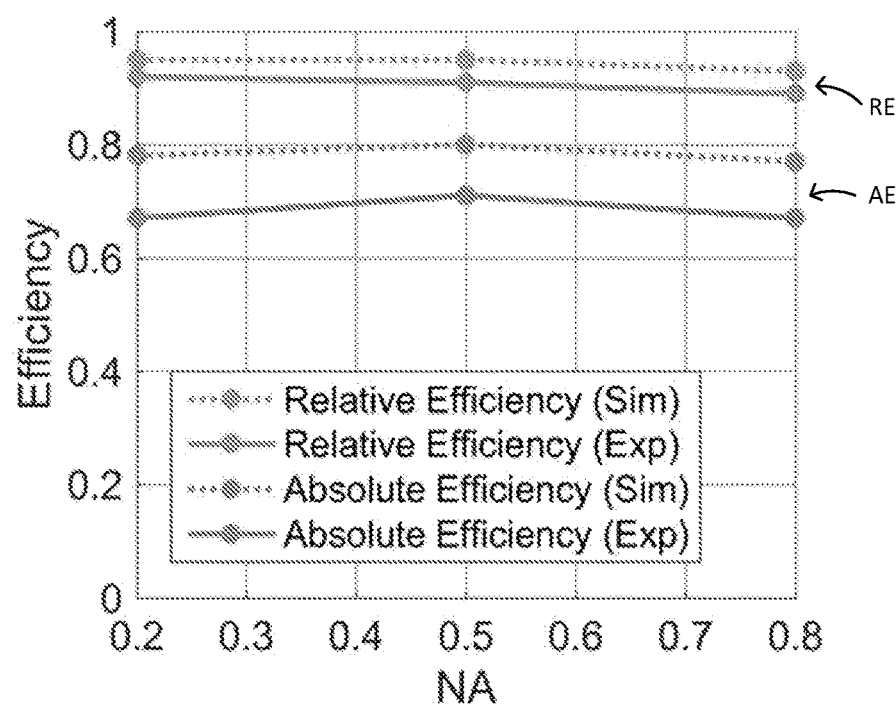
FIG. 5B shows a graph illustrating relative and absolute efficiencies of an example metalens, in accordance with various embodiments.
Figure 5C:
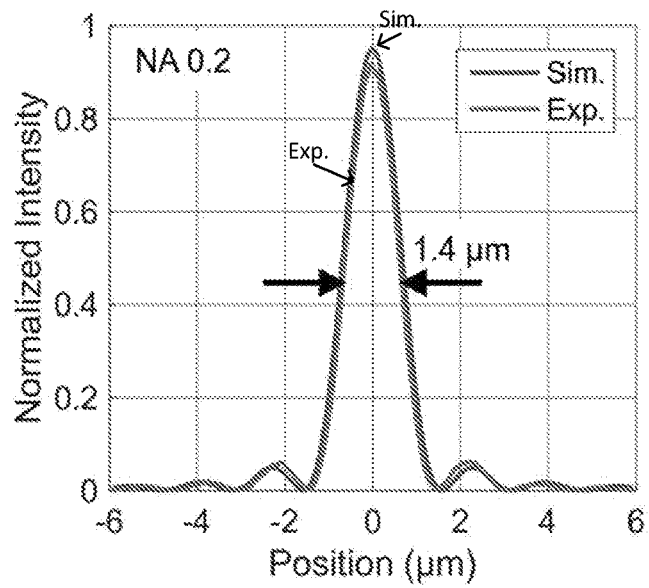
FIGS. 5C, 5D and 5E show graphs illustrating intensity versus position for example metalenses, in accordance with various embodiments.
Figure 5D:
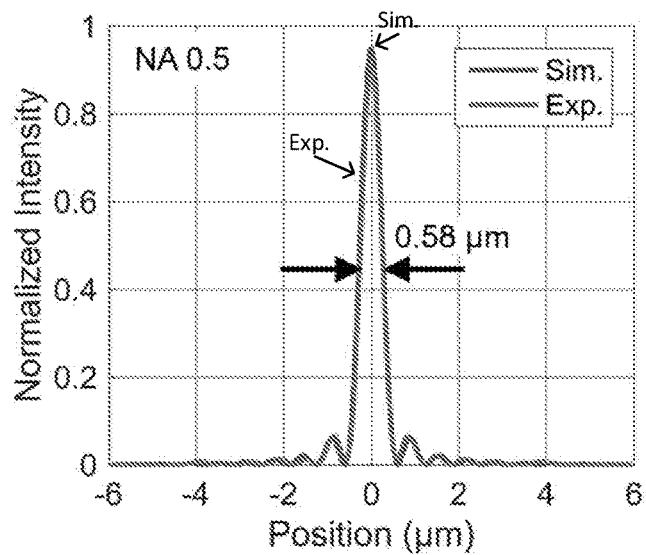
Figure 5E:
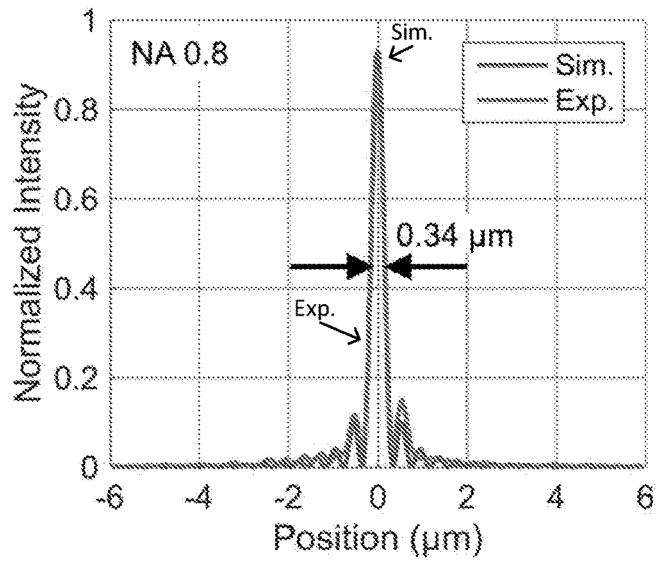

Scanning electron microscope (SEM) images of the center of a representative device are shown in FIG. 5A and show silicon nanostructures exhibiting smooth and vertical sidewalls. The metalenses all have relative efficiencies above 89% and absolute efficiencies above 67% for all NAs, which are within 10% of the simulated values (FIG. 5B). All of the metalenses have diffraction-limited performance, as shown by the theoretical and experimental intensity plots in FIGS. 5C, 5D and 5E. The device with an NA of 0.8 can focus light at a wavelength of 640 nm to a spot with a beam waist of 340 nm. The central lobes of the foci are all much stronger than the side lobes, which is indicative of high focusing efficiency.

Figure 5F:
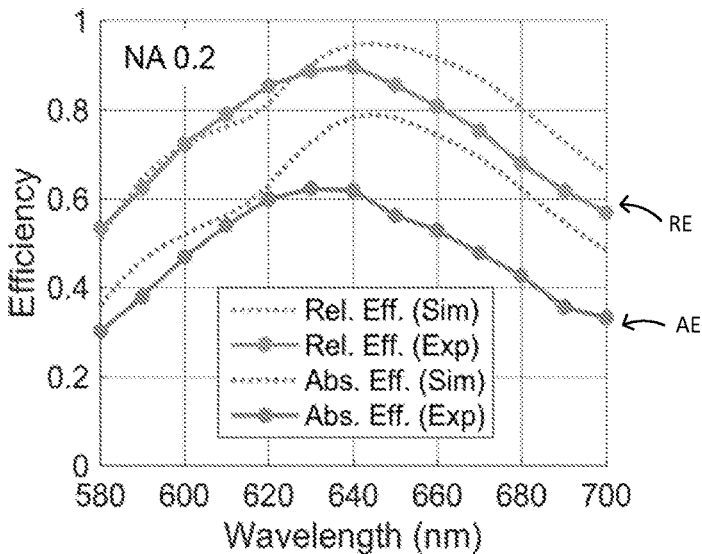
FIGS. 5F, 5G and 5H show graphs illustrating efficiency versus wavelength for example metalenses, in accordance with various embodiments.
Figure 5G:
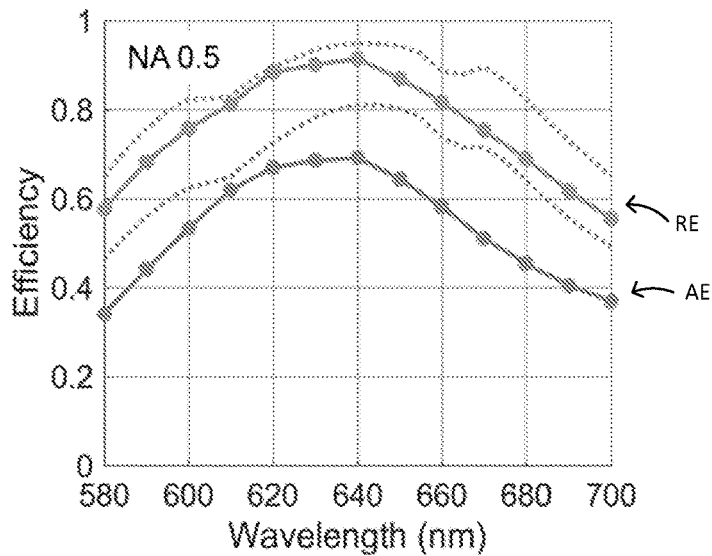
Figure 5H:
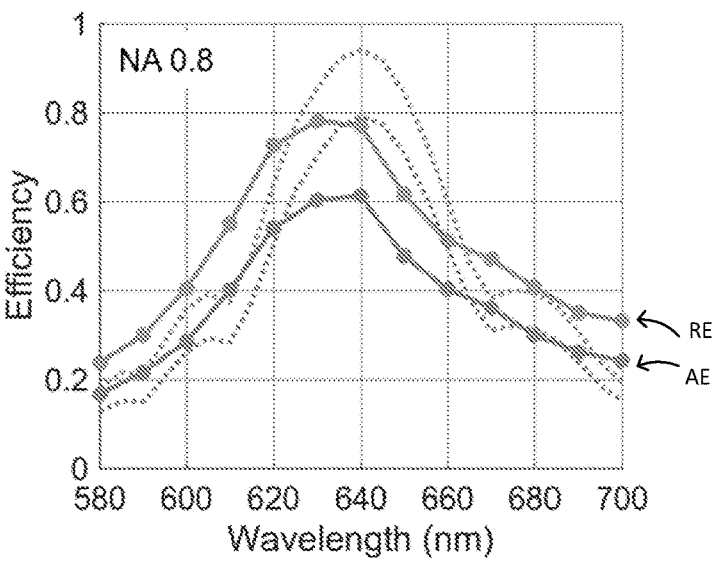

The metalenses maintain reasonably high efficiencies over wavelengths ranging from 580-700 nm, as shown in FIGS. 5F, 5G and 5H. As these lenses are not designed to be achromatic, the focal length shifts with wavelength. In other examples, the above design approaches may include achromatic functionality, which can be addressed by modifying the optimizer's figure of merit (FoM) to include multiple wavelengths. The FoM can be specified so that each metasurface section deflects all wavelengths in the same direction and realize the correct dispersion for ensuring constructive interference at the focus.

FURTHER DETAILED/EXPERIMENTAL EMBODIMENTS

In an example, to benchmark the improvements in computational efficiency afforded by the example approach disclosed herein, adjoint-based topology optimization is performed on metagratings made of silicon ridges. These periodic metasurfaces are designed to deflect light of a specific wavelength λ to the +1 diffraction order. Electromagnetic simulations are performed for topology optimization using rigorous coupled wave analysis (RCWA), also known as the Fourier modal method, on a personal computer and plot the time used to optimize a full device as a function of its width L in FIG. 1C. The simulation time scales approximately as $\mathcal{O}(L^{2.4})$, corresponding to the general scaling trend for electromagnetic solvers that utilize standard matrix multiplication and inversion algorithms. These trends show that prohibitively large computational resources are used to directly optimize devices many times larger than the wavelength.

In other examples, if the metagrating is instead divided into sections of width d, then L/d sections can be optimized. The total computation time scales as $\mathcal{O}(d^{2.4} \cdot L/d) = \mathcal{O}(d^{1.4} \cdot L)$, which is linear as a function of total size. This expression also shows that computation time generally decreases with decreasing section size. In practice, it is found that using 3λ-wide sections minimizes the total computation time, as the benefits from using smaller sections are outweighed by computational overhead in the electromagnetic solver. The computation time for a metasurface that has been optimized is plotted using 3λ-wide sections in FIG. 1C. The observed reduction in computation time allows us to optimize devices with dimensions many times larger than the wavelength using realistic computational resources. For example, with the disclosed method, millimeter-scale topology-optimized metasurfaces operating at near-infrared wavelengths can be produced in less than one day using a personal computer. In contrast, optimizing the full device at once would take nearly one year and may use intractably large amounts of memory.

Additional savings in computational time may be achieved with the herein disclosed method when using multiple computing cores because individual segments can be optimized on different cores. The disclosed design concept allows the segments to be treated independently, enabling the optimizations to be parallelized without issues concerning race conditions and synchronization. With N computing nodes, metasurfaces subdivided into N sections can be optimized in the same amount of time it takes to optimize a single segment.

These reductions in computational complexity also apply to fully three-dimensional topology-optimized metasurfaces, which experience even more severe scaling trends: the time it takes to optimize a metasurface of size L×L all at once scales approximately as $\mathcal{O}(L^{4.8})$. This trend indicates the necessity of linear sectioning for these more intricate design problems, which would reduce the runtime down to a more reasonable $\mathcal{O}(L^2)$.

In sample fabrication, crystalline silicon on glass wafers are prepared in a manner similar to that described in Sell, D., Yang, J., Doshay, S., Zhang, K. & Fan, J. A. Visible light metasurfaces based on single-crystal silicon. *ACS Photonics* 3, 1919-1925 (2016). A Pyrex and silicon-on-insulator (SOI) wafer were bonded under high temperature and pressure using hydrogen silsesquioxane. The silicon handle wafer was etched away using $SF_6$ plasma and the buried oxide layer etched away using HF solution. The wafer was diced into pieces for later use. The metasurfaces were patterned onto the piece in AR-P-6200 resist using electron beam lithography. Aluminum oxide was evaporated onto a piece and removed using liftoff to form a hard mask. The silicon was etched using a $Cl_2$ and HBr plasma. The aluminum oxide was removed using a solution of HCl at 50° C.

A collimated beam of light from a tunable white light laser is filtered with a longpass filter and polarized with a linear polarizer. The beam then passes through a weak cylindrical lens in order to focus it onto the metasurface aperture without significantly changing the angle of incidence. The metasurface then focuses the light. The focal plane is then imaged onto a complementary metal-oxide-semiconductor (CMOS) detector using a 0.9 NA, 100× objective and a tube lens.

To evaluate lens efficiencies, a line scan of the focal plane image is taken. The lens relative efficiency is calculated by integrating over a small aperture around the main focal lobe and comparing it to what would be expected for an ideal lens of the same numerical aperture. The lens absolute efficiency is calculated by multiplying the relative efficiency by the measured transmission.

A rigorous coupled-wave analysis solver known as Reticolo is used, which is developed in Lalanne, P. & Morris, G. M. Highly improved convergence of the coupled-wave method for TM polarization. *J. Opt. Soc. Am. A* 13, 779-784 (1996). The final metasurface lens designs were simulated using Lumerical finite-different time-domain (FDTD). The efficiencies are calculated by determining the optical power that is contained in the main lobe of the focus and comparing it to that expected from an ideal lens.

In some examples, optimization of aperiodic three-dimensional (3D) designs by metagrating may be demonstrated. Transmission electric (TE) polarization and transmission magnetic (TM) polarization may be used to evaluate an aperiodic 3D device design and may show that the device scatters light with both TE and TM polarizations to a desired angle with a desired phase. However, an aperiodic 3D design with the same optimization may be evaluated with TE and TM polarizations and given different angle and phase targets, and may have different scattering profiles for different incident polarizations. Optimization may also be performed at two separate wavelengths with two separate phase targets. Further information on the evaluation of aperiodic 3D designs, reference may be made to other documents such as discussed in connection with the underlying provisional document.

In a specific example, a field-flatness corrected metalens comprising four layers of dielectric metasurface (e.g., glass substrate, Si in glass, glass spacer, and Si in air), and produced by designing a series of 5 micron-wide scattering sections individually, may be evaluated. The series of sections may be stitched together, followed by post-stitching optimization. The device may focus light to the same focal plane independently of the incidence angle for incidence angles between −10 and 10 degrees, or −15 to 15 degrees, for example.

Stitching together of metasurface sections to produce a large area device may introduce errors. The errors may relate to light-matter interactions at the boundaries between sections. Sections may be separated to avoid such coupling effects. In an example, a simulated large-area device with sections displaying spurious scattering may be identified and locally optimized. By doing additional localized optimization, the sections may be placed closer together with the coupling effects being mitigated.

In a specific example, a device consisting of a single layer of silicon ridges that focuses light to a single focal point may be evaluated before and after post-stitching optimization is performed. The scattering efficiencies both before and after post-stitching optimization may be measured to verify the efficacies of using post-stitching optimization.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize the various terminology as used in the Specification (including claims) and their meaning in the art as reflected in the Specification which includes the underlying provisional patent document. Also, the Specification may describe, refer to and/or illustrate aspects useful for implementing features or portions of the disclosure by way of various materials and/or logic circuitry such as CPU programmed to perform the above-reference computations, for example, in connection with the above equations 3-6. While such materials and/or logic circuitry which may be referred to or depicted somewhat generally with reference to blocks, modules, systems and the like, it will be appreciated that such materials and/or logic circuitry may be used alone, together with other elements, and/or iteratively as appropriate to exemplify how certain embodiments may be carried out in the form or structures, steps, functions, operations, activities, etc. Further, it will be appreciated that such CPU-based circuitry for said computations may refer to or include a code-programmed and/or configured computer processing circuit with the code or software being used by the circuitry to carry out one of multiple sets of process steps by performing such sets of steps at the various levels as discussed herein with the above examples and/or in the appended claims.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method comprising:
    for each of a plurality of series-connectable wavelength-scale sections, each section having phase shifting characteristics associated with a desired phase profile, providing a plurality of connectable metasurface elements ("the metasurface elements") that optimally scatter light for each of said sections, the metasurface elements configured to form a multi-section metasurface having a metasurface phase profile corresponding to the desired phase profile.

2. The method of claim 1, wherein the metasurface elements are geometrically-optimized nanostructures arranged based on a topology optimization technique, wherein the geometrically-optimized nanostructures have optical properties for a particular or unique optical response, and wherein each of the geometrically-optimized nanostructures includes a geometric shape and size defined by at least one of same-wavelength and sub-wavelength dimensions, and the geometrically-optimized nanostructures are capable of having optical responses that change as a function of wavelength or polarization of light directed towards the geometrically-optimized nanostructureS.

3. The method of claim 1, further including providing the multi-section metasurface with neighboring or adjacent ones of the metasurface elements manifesting a common design using topology optimization that mitigates near-field optical coupling between sections.

4. The method of claim 1, wherein providing a series of wavelength-scale linear sections includes computing or discretizing the sections as linear sections using adjoint-based topology optimization.

5. The method of claim 1, further including using the multi-section metasurface, as a substrate of an optical device that can direct or focus light for at least one or a combination of the following: imaging, lithography, sensing, and use as a computing platform.

6. The method of claim 1, wherein the multi-section metasurface is one of a plurality of multi-section metasurfaces layered and adjoined to at least one other of the plurality of multi-section metasurfaces, each of the plurality of multi-section metasurfaces having optical-response characteristics in that for each of the multi-section metasurfaces, for a given periodic incident plane wave or input field, an aperiodic scattered field or output field is common to the plurality of multi-section metasurfaces.

7. The method of claim 1, further including providing the multi-section metasurface as part of at least one flat lens to focus light.

8. The method of claim 1, wherein the plurality of connectable metasurface elements correspond to a plurality of sections of substrate to have common optically-responsive properties and to be stitched together.

9. The method of claim 1, wherein the metasurface elements are geometrically optimized nanostructures with optical properties to provide a particular or unique optical response when adjoined together to include at least one layer of silicon geometric structures, and using said at least one layer of silicon geometric structures as an aperiodic optical element as part of an apparatus corresponding to: a thin-film solar cell with light in a solar spectrum passing through the at least one layer; an imaging system to direct light toward the at least one layer; or a light source to emit light via the at least one layer.

10. The method of claim 1, wherein the metasurface elements are geometrically optimized nanostructures with optical properties to provide a particular or unique optical response when adjoined together while including at least one layer of silicon geometric structures, and the method further including using said at least one layer of silicon geometric structures as an aperiodic optical element and as part of an apparatus corresponding to a type of lens including the at least one layer for which light is passed, at which light is directed, or for which light is passed and directed, wherein the type of lens is a dielectric-flat lens or a polarization-sensitive lens.

11. The method of claim 1, wherein the metasurface elements are geometrically optimized nanostructures with optical properties to provide a particular or unique optical response when adjoined together while including at least one layer of silicon geometric structures, and using said at least one layer of silicon geometric structures as an aperiodic optical element as part of a thermal management metasurface system or a micro-electro-mechanical system, the system including the at least one layer for which light is passed, at which light is directed, or for which light is passed and at which light is directed.

12. The method of claim 1, wherein the metasurface elements are geometrically optimized nanostructures with optical properties to provide a particular or unique optical response when adjoined together to include at least one layer of silicon geometric structures, and using said at least one layer of silicon geometric structures as an aperiodic optical element as part of a flexible substrate material including the at least one layer, and the method further including directing light in a solar spectrum towards the flexible substrate material.

13. The method of claim 1, further including providing a light-responsive flexible wearable device, the light-responsive flexible wearable device including a flexible substrate comprising the metasurface elements.

14. The method of claim 1, wherein the metasurface elements are geometrically optimized nanostructures with optical properties to provide a particular or unique optical response when adjoined together while including at least one layer of silicon geometric structures, and the method further including using said at least one layer of silicon geometric structures as an aperiodic optical element in an apparatus corresponding to one of the following: a thin-film solar cell with light in a solar spectrum passing through the at least one layer; an imaging system to direct light toward the at least one layer; a light source to emit via light the at least one layer; a lens in a form of a dielectric flat lens or a polarization sensitive lens; a thermal-management metasurface; a wearable flexible device; and a micro-electro-mechanical system (MEM).

15. The method of claim 1, wherein at least one of the plurality of series-connectable wavelength-scale sections is associated with a length not exceeding or less than 0.73 $\sqrt{f\lambda}$, where f refers to focal length and $\lambda$ refers to wavelength of normally-incident light, wherein for normally-incident light on the multi-section metasurface, f corresponds to focal length and $\lambda$ corresponds to wavelength of the light.

16. The method of claim 1, wherein at least one of the plurality of series-connectable wavelength-scale sections corresponds to a planar tile associated with a length not exceeding or less than 0.61 $\sqrt{f\lambda}$, and wherein the multi-section metasurface is characterized by a phase profile having an RMS wavefront error not exceeding or less than $\lambda/50$, wherein for normally-incident light on the multi-section metasurface, f corresponds to focal length and $\lambda$ corresponds to wavelength of the light.

17. The method of claim 1, wherein at least two of the plurality of series-connectable wavelength-scale sections respectively correspond to at least two planar tiles having respectively-associated lengths ranging from $2\lambda$ to $4\lambda$, and having respective field intensity profiles which are within 1% relative to at least one of one another and an ideal lens, wherein for normally-incident light on the at least two planar tiles, $\lambda$ refers to wavelength of normally-incident light.

18. The method of claim 1, wherein the metasurface phase profile has an aberration level indicative by RMS wavefront error, and at least one of the sections has a length that depends on the aberration level, and wherein the aberration level and corresponding length are within a range having one boundary at $\lambda/50$ for RMS wavefront error with length limited by or at 0.73 $\sqrt{f\lambda}$ and having another boundary at $\lambda/10$ for RMS wavefront error with length limited by or at 1.63 $\sqrt{f\lambda}$, with f corresponding to focal length and corresponding to wavelength of normally-incident light on the multi-section metasurface.

19. The method of claim 1, wherein at least two of the plurality of series-connectable wavelength-scale sections respectively correspond to at least two planar tiles having respectively-associated lengths ranging from $2\lambda$ to $4\lambda$, and having respective field intensity profiles which are within 3% relative to one another, wherein for normally-incident light on the at least two planar tiles, $\lambda$ refers to the wavelength of normally-incident light on the multi-section metasurface.

20. The method of claim 1, further including providing the multi-section metasurface as a lens integrated in and as part of an optoelectronic system with the multi-section metasurface being used to correct for aberrations including aberrations associated with field flatness.

21. The method of claim 1, further including geometrically optimizing an aperiodic device comprising a plurality of device components, each device component including at least one layer of geometric structures, by using an optimization topology associated with the desired phase profile to provide a particular optical response and including: selecting a starting point for a continuous profile to have particular optical properties for the particular optical response; iteratively converging the continuous profile to a discrete profile; and while iteratively converging to the discrete profile, adjusting edges between boundaries of the plurality of connectable metasurface elements.

22. The method of claim 1, further including geometrically optimizing an aperiodic device comprising at least one layer of geometric structures including the multi-section metasurface, by using an optimization topology associated with the desired phase profile to provide a particular optical response and including: selecting a starting point for a continuous profile to have particular optical properties for the particular optical response; and iteratively converging the continuous profile to a discrete profile during each of the iterations improving a Figure of Merit (FoM) by changing a dielectric constant at one or more locations associated with the at least one layer of geometric structures of the device and, over a plurality of the iterations, to cause a dielectric continuum to converge to the dielectric constant of materials forming the geometric structures.

23. An apparatus according to the method of claim 1, comprising:
the multi-section metasurface having the metasurface phase profile corresponding to the desired phase profile, wherein the metasurface elements are geometrically optimized nanostructures with optical properties to provide a particular or unique optical response when adjoined together while including at least one layer of silicon geometric structures, and the method further including using said at least one layer of silicon geometric structures as an aperiodic optical element in an apparatus corresponding to one of the following: a thin-film solar cell with light in a solar spectrum passing through the at least one layer; an imaging system to direct light toward the at least one layer; a light source to emit light via the at least one layer; a lens in the form of a dielectric flat lens or a polarization sensitive lens; a thermal-management metasurface; a wearable flexible device; and a micro-electro-mechanical system (MEM).

* * * * *